(12) United States Patent
Ochi

(10) Patent No.: US 8,708,009 B2
(45) Date of Patent: Apr. 29, 2014

(54) PNEUMATIC TIRE

(75) Inventor: Naoya Ochi, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 854 days.

(21) Appl. No.: 12/375,801

(22) PCT Filed: Jul. 17, 2007

(86) PCT No.: PCT/JP2007/064081
§ 371 (c)(1),
(2), (4) Date: Jan. 30, 2009

(87) PCT Pub. No.: WO2008/015904
PCT Pub. Date: Feb. 7, 2008

(65) Prior Publication Data
US 2009/0320982 A1 Dec. 31, 2009

(30) Foreign Application Priority Data

Aug. 3, 2006 (JP) ................................. 2006-212540

(51) Int. Cl.
*B60C 11/11* (2006.01)
(52) U.S. Cl.
USPC ............ 152/209.15; 152/209.18; 152/209.21; 152/902
(58) Field of Classification Search
USPC .................... 152/209.15, 209.18, 209.21, 902
See application file for complete search history.

(56) References Cited

U.S. PATENT DOCUMENTS

| 2,706,509 | A | * | 4/1955 | White ....................... 152/209.21 |
| 5,031,680 | A | * | 7/1991 | Kajikawa et al. ........ 152/209.21 |
| 5,492,161 | A | * | 2/1996 | Fuchikami et al. ...... 152/209.21 |
| 5,957,180 | A | * | 9/1999 | Kuramochi et al. ..... 152/209.21 |
| 2001/0032691 | A1 | * | 10/2001 | Ohsawa .................... 152/209.18 |
| 2005/0150582 | A1 | * | 7/2005 | Matsumura .............. 152/209.18 |

FOREIGN PATENT DOCUMENTS

| DE | 3627832 | * | 2/1988 |
| JP | 56-75004 | U | 6/1981 |
| JP | 59-025684 | * | 7/1984 |
| JP | 02-053608 | A | 2/1990 |

(Continued)

OTHER PUBLICATIONS

English translation for JP 59-025684, dated Jul. 1984.*

(Continued)

*Primary Examiner* — Richard Crispino
*Assistant Examiner* — Robert Dye
(74) *Attorney, Agent, or Firm* — Sughrue Mion, PLLC

(57) ABSTRACT

To enhance cornering performance on each road surface and improve steering stability while ensuring traction performance and breaking performance of a pneumatic tire on a snow road or off-road.
A shoulder land row (31) between a main groove (11) extending in the tire peripheral direction of a tread unit (2) and a tread end (TE) is partitioned into plan-view trapezoidal blocks (31B) with their widths reducing toward the outer side of a tire width direction by shoulder lug grooves (26) in an almost tire width direction. A plan-view trapezoidal notch (40) with its width reducing toward the inside of a block (31B) is formed in almost the center of the main groove (11) side edge of a block (31B), and an inclined surface (41) extending from the surface of the block (31B) toward the bottom of the main groove (11) is formed in the notch (40) integrally with the block (31B). This inclined surface (41) is formed stepwise by a plurality of recessed curved surfaces and protruding ridges formed between them.

10 Claims, 4 Drawing Sheets

(56) References Cited

FOREIGN PATENT DOCUMENTS

| JP | 05-229310 A | | 9/1993 |
|---|---|---|---|
| JP | 08-164716 | * | 6/1996 |
| JP | 9-142105 | * | 6/1997 |
| JP | 09-300915 A | | 11/1997 |
| JP | 2001-055014 A | | 2/2001 |
| JP | 2001-354011 A | | 12/2001 |
| JP | 2005-153732 A | | 6/2005 |
| WO | 2007/058162 A1 | | 5/2007 |

OTHER PUBLICATIONS

English machine translation for JP08-164716, dated Jun. 1996.*

* cited by examiner

Prior Art

PNEUMATIC TIRE

TECHNICAL FIELD

This invention relates to a pneumatic tire, tread unit of which is formed with a tread pattern constituted by a plurality of blocks, more specifically a pneumatic tire for four-wheel drive vehicle tire, for example, which is arranged to have enhanced off-road performance, snow road performance, and cornering performance and the like through forming notches in the blocks.

BACKGROUND ART

A pneumatic tire, in general, is formed in a tread unit thereof with a tread pattern constituted by various types of grooves, sipes and the like so that effective driving and braking performance as well as steering stability are ensured through increasing coefficient of friction between the tire and the road surface, or wet performance is improved through enhancing water drainage performance. As a typical tread pattern of this kind, conventionally, such a block pattern is well-known that a plurality of blocks are formed through partitioning by a plurality of main grooves which extend in the tire peripheral direction and a plurality of lug grooves which extend intersecting the main grooves (see Patent document 1).

FIG. 4, although it is not the one described in the patent document, is a plan view showing an example of a tread pattern in a development view of such a conventional pneumatic tire.

This pneumatic tire 100 has a tread pattern 110 which is symmetric with respect to a point on the equatorial plane CL of the tire, as shown in the drawing, in tread unit 101, a plurality of land rows 113 (five rows in the drawing) are formed by two main grooves 111 which are disposed sandwiching the tire equatorial plane CL and extending almost linearly in the tire peripheral direction, and two main grooves 112 disposed between each main groove 111 and the both tread ends TE and extending zigzag in the tire peripheral direction. In addition, a plurality of lug grooves 114 are provided, which are extending in inclined manner in the tire width direction intersecting the main grooves 111 and 112, so as to partition each land row 113 into a plurality of blocks 115 respectively by these lug grooves 114. Further, in this pneumatic tire 100, a plurality of sipes 116 are formed in each block 115 and in edge portions fronting the main groove 111, 112, or lug groove 114 of each block 115, one or two notches 117 are formed respectively.

Herein, the term notch stands for a notch which is cut into inside of the block from the edge of block, one end of which is opened out to each groove and the other end terminates inside of the block, and which is a recess that is formed locally at the edge of the block. In this conventional pneumatic tire 100, such notches 117 are formed in the block 115 to increase edge element of the block 115 that exerts edge effect, which enhances snow road performance and off-road performance through improving traction performance, braking performance, and the like of the pneumatic tire 100.

However, conventionally, it is usual that the notch 117 is formed such that the block 115 is cut from the surface thereof to the vicinity of the bottom of each groove 111, 112, and 114 linearly in the radial direction of the tire towards inside thereof so as to form substantially same depth as that of each groove 111, 112, and 114, or alternatively, the bottom is raised up so as to be formed slightly shallower by 1 or 2 mm from the bottom of each groove. Therefore in this conventional pneumatic tire 100, the rigidity of the block 115 is deteriorated and may cause to affect other tire performances.

That is to say, when the notches 117 are formed to have the same depth as that of the groove depth, off-road performance, snow road performance and the like can be improved, nevertheless the rigidity of blocks 115 (especially the blocks 115 in the shoulder land row 113 which is the outside-most in the direction of tire width) can not be ensured and cornering performance on dry surface, wet surface and the like is deteriorated, bringing about a tendency that steering stability such as handling and so on becomes poorer. On the other hand, when the notch 117 is formed to be shallower than the depth of the groove, the deterioration of rigidity of the block 115 and accompanied poorer cornering performance can be restrained to a certain extent, because of mass reduction of the notch 117, improvement effect of traction performance, braking performance and the like become smaller. In addition, although the notch 117 works effectively in improvement of traction performance and braking performance in snow road driving and so on, while ensuring the edge element mainly in back and forth direction (tire peripheral direction), there is a problem that it is not sufficient to obtain improvement effects of cornering performance (handling performance, anti-skid performance and the like) owing to increase of the edge element in transverse direction (tire width direction).

Consequently, in conventional pneumatic tires 100 provided with such notches 117, it is not feasible to coexist enhancement of snow road performance and off-road performance of tire through ensuring the traction performance and braking performance, and enhancement of the cornering performance on each road surface through ensuring rigidity and the like of the blocks 115, hence it is difficult to achieve effective improvement of the steering stability of tires.

Patent document 1: JP 05-229310 A

DISCLOSURE OF THE INVENTION

Problems to be Solved by the Invention

The present invention has been accomplished in the light of the forementioned conventional problems, the object of which is to enhance cornering performance on each road surface and improve steering stability through enhancement of off-road performance and snow road performance while ensuring traction performance and braking performance of a pneumatic tire on a snow road or off-road.

Means to Solve the Problems

According to a first aspect of the present invention, there is provided a pneumatic tire comprising: a plurality of land rows formed with a plurality of main grooves extending in a tire peripheral direction, in a tread unit thereof, the land rows being partitioned into a plurality of blocks by a plurality of lug grooves extending in the intersecting direction with the main grooves, wherein a block in at least one of the land rows has a notch cut into the block from an edge portion thereof, and the notch has an inclined surface therein formed with a step portion extending in a groove bottom direction on a side of the edge portion of the block from a surface inside the block.

According to a second aspect of the present invention, there is provided the pneumatic tire according to the first aspect, wherein the step portion of the inclined surface is formed in a stairstep shape constituted by a plurality of recessed curved surfaces and protruding ridges provided between the recessed curved surfaces.

According to a third aspect of the present invention, there is provided the pneumatic tire according to the second aspect, wherein the protruding ridge is constituted by an upper surface which is parallel in tire width direction and a side surface which is parallel in tire radial direction, and an angle of top end side of the protruding ridge is formed to be 80 degrees to 120 degrees.

According to a fourth aspect of the present invention, there is provided the pneumatic tire according to the second or the third aspect, wherein the inclined surface includes at least two protruding ridges.

According to a fifth aspect of the present invention, there is provided the pneumatic tire according to any of the first to the fourth aspect, wherein, a shoulder land row disposed between a tread end of the tread unit and the outside-most main groove in the tire width direction has the block having a plan-view trapezoidal shape, width of which is gradually reduced from the main groove side toward the tread end side; and a main groove side edge portion of the trapezoidal shape block has the notch.

According to a sixth aspect of the present invention, there is provided the pneumatic tire according to any of the first to the fifth aspect, wherein the notch is formed to be a plan-view trapezoidal shape, width of which is gradually reduced from edge of the block toward inside of the block.

(Function)

In the present invention, notches are provided in a block in at least one row of the land row formed in the tread unit to increase edge element of the block which performs edge effect. Further, inside of the notch, the inclined surface, which is formed with steps from the block surface toward the bottom of the groove, is provided so as to ensure rigidity of the block through restraining deterioration of rigidity of the block accompanied with the provision of the notches, and hence the edge effect in the notches is also performed.

Effects of the Invention

According to the present invention, it is possible to enhance cornering performance on each road surface and improve steering stability through enhancement of off-road performance and snow road performance while ensuing traction performance and braking performance of a pneumatic tire on a snow road or off-road.

DESCRIPTION OF THE REFERENCE SYMBOLS

1—pneumatic tire, 2—tread unit, 10—tread pattern, 11—main groove, 21~26—lug groove, 27—thin groove, 29—sipe, 30—central land row, 30B—block, 31—shoulder land row, 31B—block, 40—notch, 41—inclined surface, 42—protruding ridge, 43—recessed curved surface, 50—chamfer, CL—equatorial plane of tire, TE—tread end

BEST MODES FOR CARRYING OUT THE INVENTION

Hereinafter, one embodiment according to the present invention will be described referring to drawings.

A pneumatic tire according to the embodiment is, for example, a pneumatic tire used for four-wheel drive vehicles and the like, which has well-known structure of a pneumatic tire which is provided with a pair of bead cores disposed in tire bead portions, a carcass layer constituted by at least one ply of carcass which extends toroidally across the beads, and belt layers and tread, disposed on the peripheral side of carcass layer in the tread unit.

Figure 1:
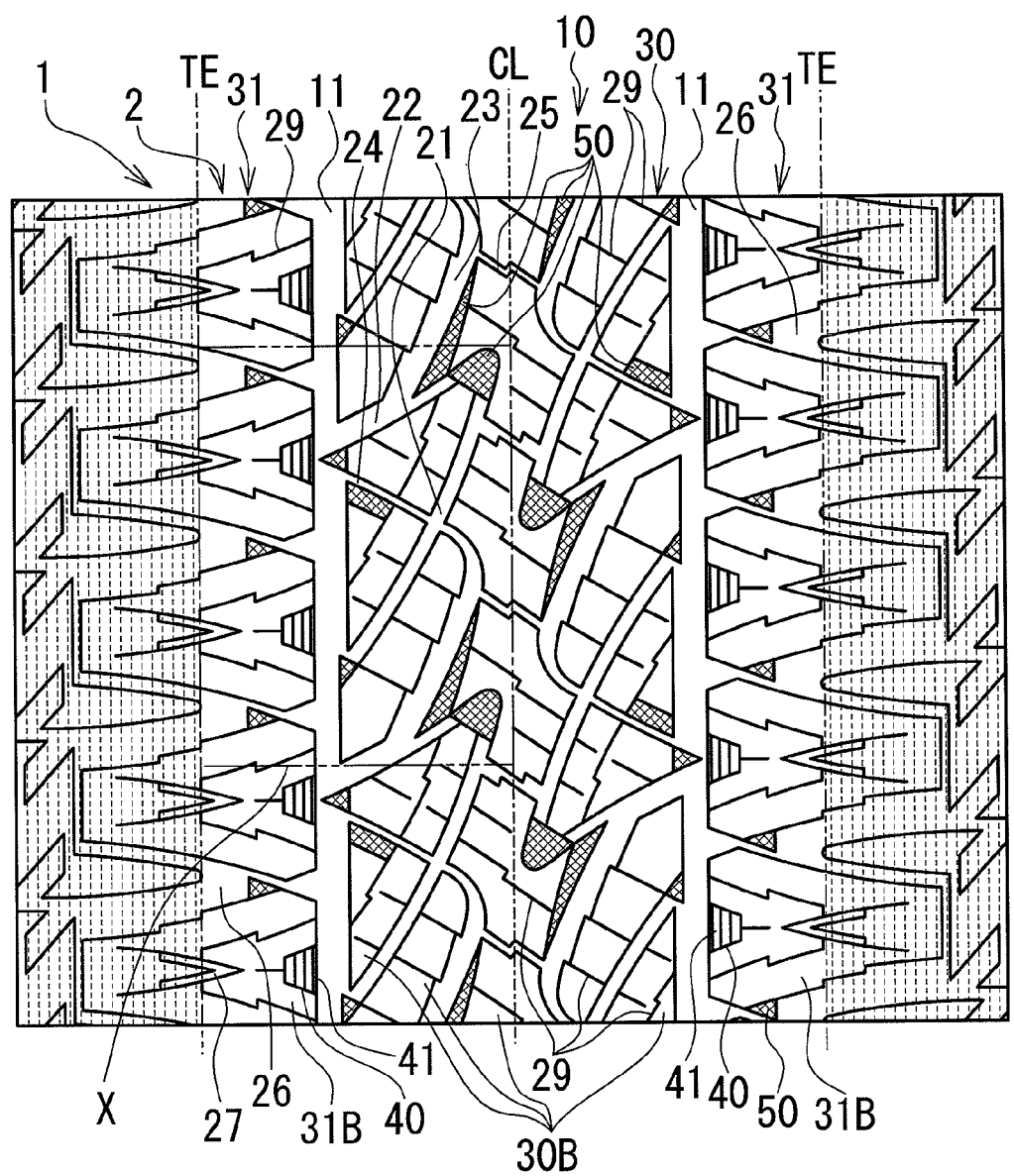
FIG. 1 is a plan view showing a development of tread pattern formed in a tread unit of a pneumatic tire according to a present invention.

FIG. 1 is a plan view showing a development of tread pattern 10 formed in a tread unit 2 of a pneumatic tire 1 according to the present invention.

The pneumatic tire 1 has a symmetric tread pattern 10 with respect to a point on the tire equatorial plane CL, and also has, as shown in the figure, a plurality of main grooves 11 (herein, two grooves) extending in the peripheral direction of the tire and a plurality of lug grooves 21 to 26 extending in the direction crossing with the main grooves 11. This pneumatic tire 1 also has a plurality of land rows 30, 31 (herein, three rows) extending in the peripheral direction of the tire formed through partitioning by respective main groove 11 and the tread end TE in the tread unit 2, while respective land row 30, 31 is interrupted by a plurality of the lug grooves 21 to 26 to partition a plurality of blocks 30B, 31B.

In this embodiment, the two main grooves 11 are formed to have two kinds of groove width, narrower width portion and wider width portion, through varying the groove wall position at the inner side in the direction of tire width, so that two main grooves are disposed between both tread ends TE sandwiching the tire equatorial plane CL therebetween. Owing to this, the broader central land row 30 which is positioned on the tire equatorial plane CL partitioned by the both main grooves 11 and the shoulder land row 31 which is positioned at the outside-most side (shoulder side) in the tire width direction partitioned by the main grooves 11 and amidst between the tread end TE and the main groove, are formed. In addition, the lug grooves 21 to 26 are comprised of the first to the fifth lug grooves 21 to 25 which are formed in the central land row 30 and the shoulder lug groove 26 which is formed across the shoulder land row 31, each of which is disposed at the predetermined intervals in the tire peripheral direction.

The first to the fifth lug grooves 21 to 25 are arranged symmetrically with respect to a point on the tire equatorial plane CL, and the first to the fourth lug grooves 21 to 24, which are provided in the both sides of the tire equatorial plane CL, are inclined with predetermined angle in opposite direction with respect to the tire peripheral direction, having the tire equatorial plane CL being sandwiched. Furthermore, in each left and right side of the central land row 30 sandwiching the tire equatorial plane CL, the inclination direction of the first to the third lug groove 21 to 23 are formed to be identical with respect to the tire peripheral direction, and the inclination direction of the fourth lug groove 24 and the fifth lug groove 25 are formed in opposite direction to the first to the third lug groove 21 to 23 with respect to the tire peripheral direction respectively. Hereinafter these lug grooves 21 to 25 will be described taking as an example one side of the central land row 30 (left-hand side in the drawing) sandwiching the tire equatorial plane CL.

Figure 2:
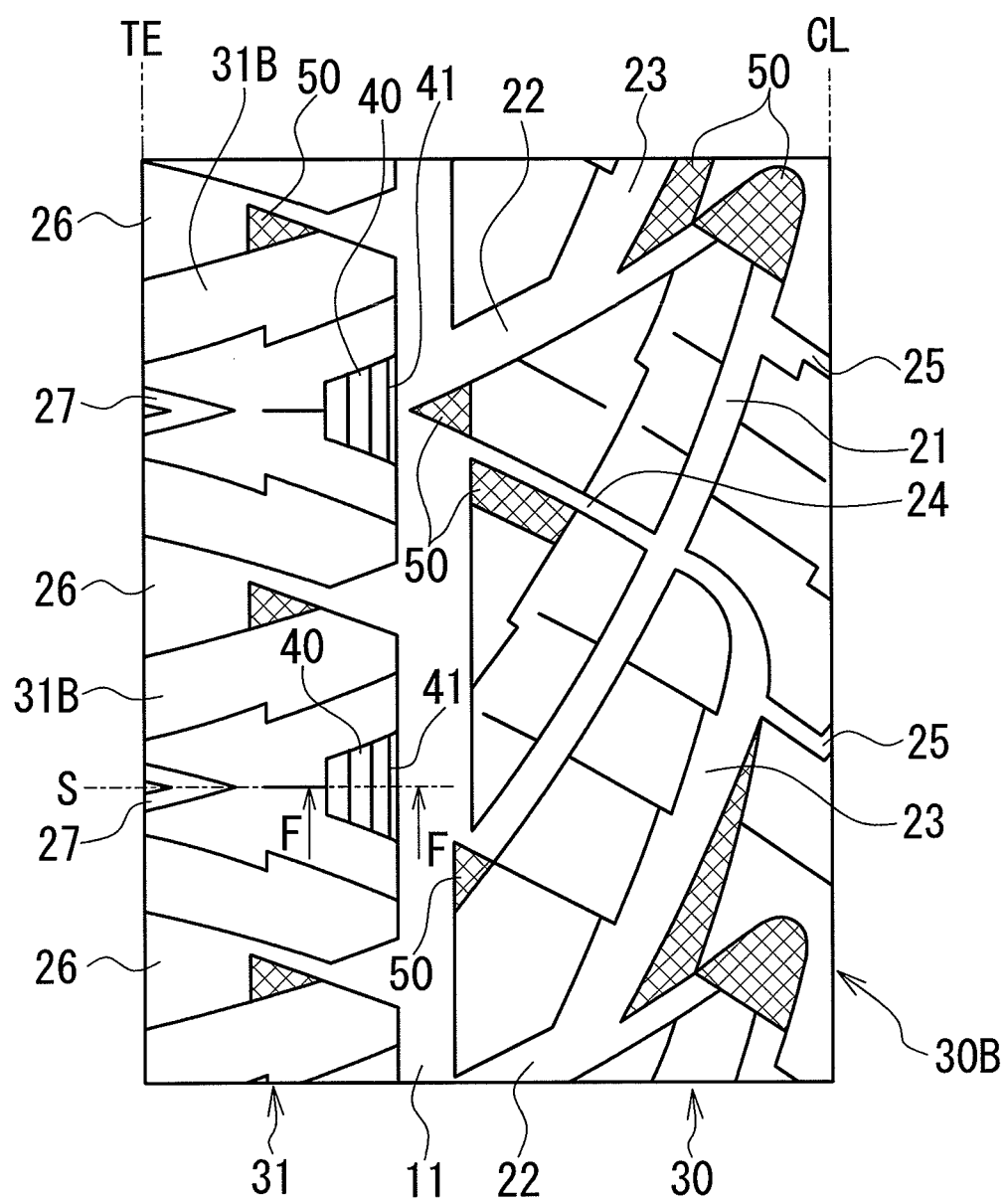
FIG. 2 is an expanded plan view of the X portion of FIG. 1.

FIG. 2 is an expanded plan view showing X-portion in FIG. 1.

The first lug groove 21, as shown in the drawing, is formed from one end portion (external side in tire width direction) communicating with the main groove 11 toward the tire equatorial plane CL, while being inclined with a steep angle comparatively close to the tire peripheral direction (in the drawing, inclined toward right upper direction diagonally), and the other end of the first lug groove (central side of the tire)

terminates in the vicinity of the tire equatorial plane CL in the central land row 30. The second lug groove 22 is arranged so that one end portion communicating with the main groove 11 is disposed with a predetermined interval from the end portion of the first lug grove 21 in the tire peripheral direction, and from that point the second lug groove is formed to be inclined with an angle less steep than that of the first lug groove 21 and close to the tire width direction to be terminated at the same position as the first lug groove 21. Accordingly these lug grooves 21, 22 are connected together in the vicinity of the tire equatorial plane CL, and as a whole substantially V-shape is formed to extend in the tire peripheral direction while being inclined.

The third lug groove 23 is formed to be inclined with almost same steep angle that of the first lug groove 21 commencing from substantially middle position of the second lug groove 22 in the tire width direction toward the tire equatorial plane CL. The fourth lug groove 24, one communicating end thereof with the main groove 11 being provided between the first lug groove 21 and the second lug groove 22 (herein, at the closer side to the second lug groove 22), is formed to commence from that point and inclined with a similar level of inclination angle in the opposite direction to the second lug groove 22 with respect to the tire width direction, and intersects the first lug groove 21, heading to the tire equatorial plane CL. The third lug groove 23 and the fourth lug groove 24 are curved in the vicinity of the tire equatorial plane CL and both end portions are joined together into one.

In each of these lug grooves 21~24, one of the groove walls (left side wall in the drawing) of the third lug groove 23 is formed to be zigzag, and the groove widths of the second lug groove 22 across the third lug groove 23 are formed to be different from each other side. As a whole, the groove width of the third lug groove 23 is formed to be broadest, that of the fourth lug groove 24 thinnest, groove widths of the first lug groove 21 and the second lug groove 22 are formed to be intermediate. Moreover in the both sides sandwiching the tire equatorial plane CL (see FIG. 1), both the first lug grooves 21 and both the third lug grooves 23 are connected in the vicinity of the tire equatorial plane CL with other respectively via the fifth lug grooves 25 which extend while bending. Each of these lug grooves 21 to 25 is communicated with each other via respective connection portion and intersecting portion and the whole of them transverses the central land row 30, segments the central land row 30 to partition into a plurality of blocks 30B such as plan-view triangle shapes or rectangular shapes.

To the contrary that the central land row 30 is formed with a plurality of types of the lug grooves 21 to 25, in the shoulder land row 31, a plurality of single type of shoulder lug grooves 26 are disposed with constant intervals in the tire peripheral direction. The groove width of each shoulder lug groove 26 is formed to be broadest at the side of the tread end TE, gradually getting thinner toward the main groove 11 in the inner side of the tire width direction, and to be widened slightly at the opening end to the main groove 11. As a result, the shoulder land row 31 is segmented with the shoulder lug grooves 26 to be partitioned into a plurality of the blocks 31B and the substantial shape of each block 31B is formed to be a plan-view trapezoidal shape, the width of which is reduced gradually toward the tread end TE side from the main groove 11 side. That is to say, the blocks 31B, looking at from outside in tire radial direction, are formed to be a substantially trapezoidal shape (tread shape), both edge portions of which are inclined in opposite direction with similar level of inclination angle with each other so that the distance between both end portions of the block 31B facing to the side of the shoulder lug groove 26 is gradually shortened toward external side in the tire width direction, and are disposed with predetermined intervals in the tire peripheral direction, the longer side of the substantially parallel sides thereof facing to the main groove 11 side and the other shorter side facing to the tread end TE side.

In the pneumatic tire 1 according to the present embodiment, a plurality of sipes 29 (see FIG. 1) are formed in each of blocks 30B, 31B to cross the blocks 30B, 31B, or to terminate one end thereof inside of the blocks 30B, 31B, and in each of blocks 31B in the shoulder land rows 31, the thin grooves 27 are formed which extend in substantially V-shape from the inside of the block 31B toward the out side of the tread end TE. In addition, chamfered portions 50 are provided at a plurality of places in the land rows 30, 31, the chamfered portion being made through chamfering the predetermined portion (each portion shown by grate-like hatching in the drawing) facing to the main grooves 11 or the lug grooves 21 to 26 such as corners of the blocks 30B, 31B, in smoothening gradually from the top surface of the blocks toward the bottom of the grooves.

In addition to the above, the pneumatic tire 1 is provided with notches in the block in at least one row of the land rows, the notches being cut into the inside of the block from the edge side thereof which faces to each main groove, in a predetermined shape. The notch is a recessed portion which is generated locally at the edge portion of the block, one end of which opens to each groove, and the other end terminates inside of the block, and herein a notch 40 is provided at one place respectively in a block 31B of the both shoulder land rows 31.

The notch 40 (see FIG. 2) is formed at the edge (longer side portion) on the main groove 11 side to be in a plan-view trapezoidal shape, the width of which reduces from the edge of the block 31B toward the inner side of the block 31B. That is, the notch 40 has substantially parallel ends, or cut-in end (shorter end) into inside of the block 31B and opened end (longer end) to the main groove 11, looking at from the outside in the tire radial direction in similar way to the block 31B, and the notch width between the both ends are formed to be gradually widened from the inside block 31B toward the main groove 11 to have a substantially trapezoidal shape (notched tread pattern), and is disposed at almost center of the side edge of the main groove 11 in the block 31B. Herein the notch 40 and the block 31B are substantially in a geometrically similar shape and are almost symmetry with respect to the centerline S extending almost in the tire width direction, having the center line S in-between.

In the notch 40, an inclined surface 41 is provided integrally with the block 31B in order to ensure rigidity of the block 31B, the inclined surface 41 (referred to as an inclined step hereinafter) extending from the surface of the block 31B toward the bottom of the groove at the edge side of the block 31B (here, the bottom of the main groove 11) and being formed with steps having a predetermined sectional shape. Herein the inclined steps 41 are provided covering the whole area of the notch 40, and are formed so as to be inclined gradually from the surface of the block 31B of the cut-in end portion (shorter end) positioned in the notch 40 of the block 31B up to the vicinity of the bottom of the main groove 11 side opening end (longer end) while the surface being curved.

Figure 3:
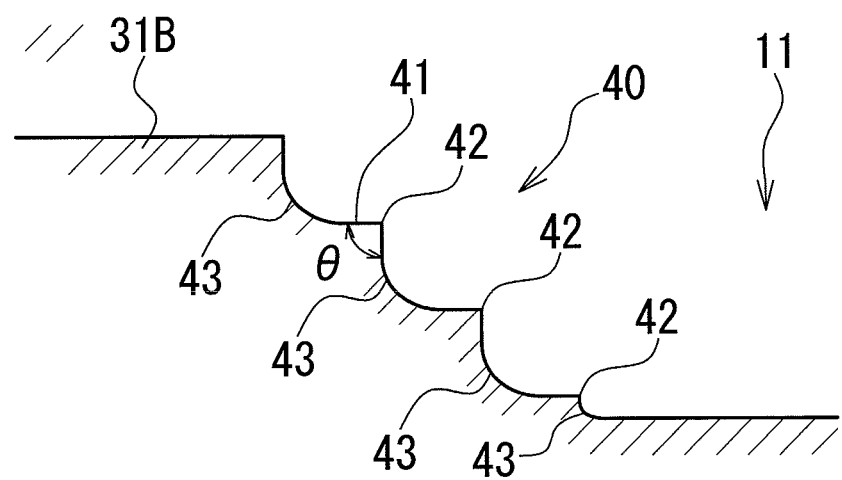
FIG. 3 is a sectional view of FIG. 2 viewed from the arrowheads along the line F-F.

FIG. 3 is a sectional view of FIG. 2 viewed in the direction of arrows F-F, showing the sectional shape in the perpendicular direction to the inclined steps 41 (here, substantially in the tire width direction).

The inclined steps 41 (steps in an inclined surface) are formed stepwise by a plurality of recesses curved surface 43 and at least two (herein, actually three) protruding ridges 42 into the inside of the notch 40 formed between them, and recessed surfaces gently curved 43 are formed between the surface of the block 31B and the outer-most protruding ridge 42 in the tire radial direction, between each protruding ridge 42, and between the inner-most protruding ridge 42 in the tire radial direction and the bottom of the main groove 11.

Each protruding ridge 42 is constituted by a upper surface parallel to the tire width direction and a side surface parallel to the tire radial direction, and the top end side angle θ between the upper surface and the side surface, in other words, the sectional angle in a orthogonal section with the protruding ridge 42 in the edge portion of the L-like section is formed to be about 90 degrees (herein, between 80 degrees and 120 degrees). Each protruding ridge 42 is disposed with a substantially constant interval in the inclination direction of the inclined surface 41 from the block 31B surface, and the distance between the block 31B surface and the outer-most protruding ridge 42 in the tire radial direction, the distance between each protruding ridge 42 in the tire radial direction, and the distance between each protruding ridge in the orthogonal direction thereto (here, in the tire width direction) are arranged to be substantially equal. Consequently, recessed curved surfaces 43 formed between the ridges have substantially same sectional shapes, however herein since the inner-most protruding ridge 42 is disposed close to the bottom of the main groove 11, the recessed curved surface 43 connecting the particular protruding ridge 42 with the bottom of the main groove 11 has a different shape that is shorter than others. It should be noted that, in the present invention, the words "parallel in the tire width direction" means mainly to be parallel in the tire width direction but also a slightly inclined state (for example, 10 degrees more or less) as well with respect to the tire width direction, and words "parallel in the tire radial direction" means mainly to be parallel in the tire radial direction but also a slightly inclined state (for example, 10 degrees more or less) as well with respect to the tire radial direction as well.

In the pneumatic tire 1 described so far according to the present embodiment, since the notch 40 formed in the block 31B can increase the edge element of the block 31B, the edge effect that is performed by the block 31B can be enhanced, and the traction performance and braking performance on snow road or off-road can be improved. In addition, the inclined steps 41 formed in the notch 40 can restrain deformation and rigidity reduction of the block 31B, similarly in a case where the notch 40 is raised so as to become shallower. As a result, on-road handling performance on dry road surface and wet road surface can be ensured through securing the block rigidity of the shoulder land row 31.

In addition, each step of the inclined steps 41 (protruding ridge 42) acts similarly as a block edge in the notch 40, and works as the edge element mainly in the transverse direction and the like against snow or mud intruded in the notch 40, and whereby the edge element even in the notch 40 depth direction can be increased. Owing to this, in addition to the edge effect on the block 31B surface, the edge effect is performed even inside of the notch 40, it is possible to enhance the handling performance and the anti-skid performance on snow road or off-road.

Therefore according to the present embodiment, while ensuring traction performance and braking performance of the pneumatic tire 1 on a snow road or off-road, it is possible to enhance cornering performance on each road surface and to improve steering stability through improvement of off-road performance and snow road performance. In this pneumatic tire 1, a plurality of land rows 30, 31 are formed in the tread unit 2 by a plurality of main grooves 11 extending in the tire peripheral direction and each land row 30, 31 is partitioned into a plurality of blocks 30B, 31B by the lug grooves 21 to 26, and thereby not only the water drainage performance but also the fundamental performances required for comfort-oriented pneumatic tire can be ensured.

Further in this pneumatic tire 1, due to the fact that the block 31B of the shoulder land row 31 is formed to be a plan-view trapezoidal shape as described above, regardless of rotation direction of the pneumatic tire 1, or regardless of installation direction onto a vehicle, constant traction performance and braking performance can be executed. At the same time, an eccentric wear which tends to be generated in the shoulder land row 31 due to influence of the rotation direction or installation position onto the vehicle can also be restrained. Further, due to such an arrangement that the width of the block 31B is formed to be gradually reduced from the main groove 11 side to the tread end TE side, and the shoulder lug grooves 26 on the both sides of the block is formed to be narrow at the main groove 11 side and getting broader toward the outside in the tire width direction, anti-eccentric wear performance and noise performance of the shoulder land row 31 in addition to the traction performance and braking performance on snow road and the like, which was described above, can be improved, and thus enabling to coexist respective performance.

It is known that the shoulder land row 31 which is disposed between the tread end TE of the tread unit 2 and the main groove 11 of the outer-most side in the tire width direction influences cornering performance and the like of a pneumatic tire 1 in comparatively significant level. Therefore it is preferable to provide the notch 40 in the block 31B of the shoulder land row 31 as in the present embodiment, however even the notch 40 formed in other land rows such as the block 30B of the central land row 30 can fully secure the above mentioned effect.

It is preferable to form the notch 40 to be plan-view trapezoidal shape as mentioned above, the width of which is gradually reduced from the block 31B edge toward the inside of the block 31B. In this case, generation of corners having acute angles or tight space inside of the notch 40 can be avoided, and thereby snow or mud intrudes into every nook or corner of the notch 40 smoothly. As a result the notch 40 can securely grasp snow, mud and the like, the edge effect of the notch 40 in the depth direction can be securely performed.

Furthermore, the notch 40 is preferably formed at the edge of the main groove 11 side of the block in a case where the notch 40 is provided in the block 31B and the like of the shoulder land row 31. In this case, the notch 40 and the inclined steps 41 face substantially to the tire width direction, which accordingly increase the transverse direction edge element, hence cornering performance of the pneumatic tire 1 can be improved effectively. In addition, in a case where, as the present embodiment, the notch 40 is formed at almost center of the main groove 11 side edge of the block 31B, and both of the notch 40 and the block 31B are formed to be in almost similar trapezoidal shapes, and the longer edges of the both are disposed at the main groove 11 side, thickness of the block 31B is equalized as a whole and rigidity deterioration is restrained, and thus comparatively large block rigidity can be ensured.

In addition, in a case where the recessed curved surface 43 is formed in the inclined steps 41, movement of snow or mud and so on are smoothed or similar things happen, and thereby grasping performance of snow or mud and so on by the inclined steps 41 (protruding ridges 42) is enhanced. At the same time, when the notch 40 comes out of the ground contact plane, snow or mud and so on that have been intruded into the notch 40 is discharged smoothly from the notch 40, and thus jamming of them can be prevented. Therefore the inclined steps 41 are preferably formed to be stepwise, composing of the protruding ridges 42 inside of the notch 40 and the recessed curved surfaces 43. In order to execute sufficiently large edge effect in the depth direction in the notch 40, it is preferable to provide at least two protruding ridges 42 in the inclined steps 41, in a case of which the inclination of the inclined steps 41 becomes less steep and rigidity reduction of the block 31B can be restrained more securely.

In a case where the top end angle of the protruding ridge 42 formed in the inclined steps 41 is made to be an acute angle less than 80 degrees, the rigidity thereof becomes lower and edge element function is deteriorated, and thereby there is a risk that wear might become large due to intruded mud and the like into inside of the notch 40. In the meanwhile, when the angle is made to be an obtuse angle equal to or more than 120 degrees, snow, mud and the like are hardly caught and there is a risk of the edge effect deterioration. Therefore the top edge angle of the protruding ridge 42 is preferably made to be between 80 degrees and 120 degrees.

It should be noted that, in the present embodiment, two main grooves 11 are formed in the tread unit 2 sandwiching the tire equatorial plane CL, it may be accepted that three or more main grooves 11 are formed including the main groove 11 on the tire equatorial plane CL. It may be also accepted that any other shape of the main groove 11 rather than substantially linear shape, such as a main groove extending in zigzag state, for example. The notch 40 may be formed at other positions rather than the edge portions of the each block 30B, 31B of the main groove 11 side, such as at the edge portions facing to each lug groove 21 to 26 or at the edge corners at intersections of grooves. Further in this pneumatic tire 1, a tread pattern 10 is formed so as to be symmetry with respect to a point on the tire equatorial plane CL, however, for example, a tread pattern 10 which is symmetry with respect to the tire equatorial plane CL or a tread pattern 10 which is not symmetry may be formed in the tread unit 2 and the notches 40 and the inclined steps 41 may be formed in those blocks.

(Tire Test)

Figure 4:
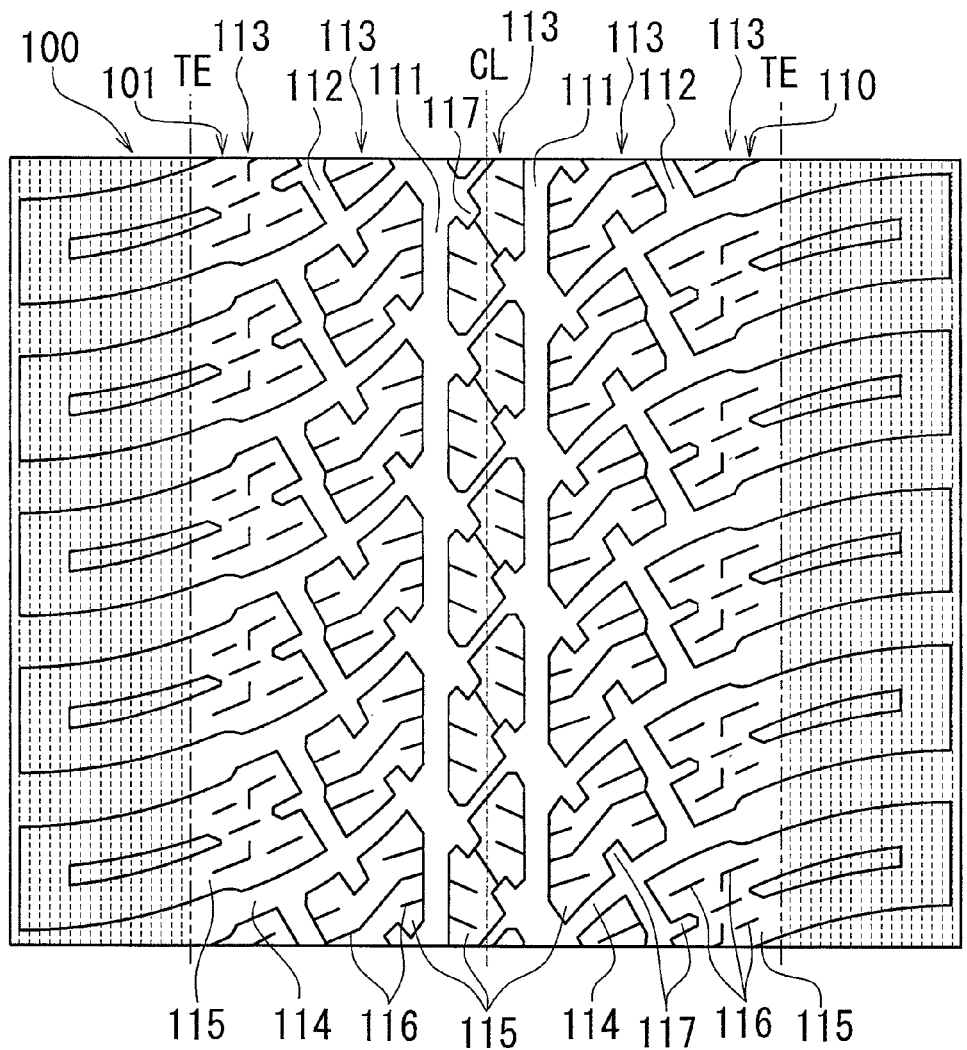
FIG. 4 is a plan view showing a development of an example of a conventional pneumatic tire tread pattern.

In order to confirm effect of the present invention, a tire 1 mentioned as an example which is formed with the tread pattern 10 (see FIG. 1) that has such configuration as described so far (referred to as an implemented article hereinafter), and a tire 100, a comparison example (referred to as a comparison article hereinafter), which is formed with the above mentioned conventional pattern 110 (see FIG. 4), were produced to conduct various tests mentioned below. All of these tires are automobile pneumatic radial tires having the size of 265/70R17 that is conformed to JATMA YEAR BOOK (Standard of Japanese Automotive Tire Manufacturers Association, 2006), and the groove depth of each groove was formed to be 10.5 mm.

The implemented article is arranged to have the tread pattern 10 as described above which is symmetry with respect to a point on the equatorial plane CL and to form the width of two main grooves 11 are 8 mm at the narrow portion and 11 mm at the broad portion. In the implemented article, the notches 40 are formed in the blocks 31B in the shoulder land row 31 so that opened end width (longer end) at the main groove 11 side is 15 mm, cut-in end width in the block 31B (shorter end) is 7.5 mm, length in the tire radial direction is 10 mm, and the protruding ridge 42 in the inclined steps 41 are formed to be three steps. Each lug groove in the central land row 30 is formed respectively so that as for the first lug groove 21, the width is 5 mm, the angle with respect to the tire peripheral direction is 20 degrees, as for the second lug groove 22, the width is 4 to 8 mm, the angle with respect to the tire peripheral direction is 65 degrees, as for the third lug groove 23, the width is 6 to 15 mm, the angle with respect to the tire peripheral direction is 25 degrees. In the meanwhile, the fourth lug groove 24 is formed so that the width is 3 mm, the angle with respect to the tire peripheral direction is 60 degrees in the opposite direction to the above lug groove 21, 22, 23. The central land row 30 is partitioned by these lug grooves respectively into the blocks 30B with the width of 17 to 40 mm, and a plurality of sipes 29 with the width of 0.7 mm are formed in each block 30B. On the other hand, the comparative article is formed with the conventional notch 117 that has no inclined steps 41 in the block 115.

In the tire tests, respective tires having inner pressure of 230 kPa are mounted on an actual vehicle, which is charged by a load equivalent to two passengers weight on board, and each performance is evaluated.

Table 1 shows each test result of the implemented article and the comparison article respectively using an index of 100 for the comparison article in each result of the test.

TABLE 1

|  | Comparison article | Implemented article |
| --- | --- | --- |
| Index of braking and traction performance on snow road | 100 | 100 |
| Index of feeling on snow road | 100 | 109 |
| Index of feeling on off-road | 100 | 107 |
| Index of steering stability in dry condition | 100 | 105 |
| Index of steering stability in wet condition | 100 | 105 |

In Table 1, as for the braking performance index on snow road, braking distances with full braking on a compacting snow road from 40 km/h speed were compared, and as for the traction performance on snow road, acceleration time were measured and compared for 50 m distance on a compacting snow road from standing start, and each performance was evaluated. As a result, indexes for the comparison article and the implemented article were both 100, and braking and traction performance on snow road can be maintained at the similar level for the both.

Index of feeling on snow road is the overall evaluation of braking performance, acceleration performance, straight running performance, and cornering performance on a test course of compacting snow road, and evaluation was made by test drivers through feeling. As a result, the implemented article index was raised to 109 compared with the comparison article index of 100, which shows the overall evaluation on snow road was improved.

Index of off-road feeling is the overall evaluation of braking performance, acceleration performance, straight running performance, and cornering performance on a test course of unpaved road, and evaluation was made by test drivers through feeling. As a result, the implemented article index was raised to 107 compared with the comparison article index of 100, which shows the overall evaluation on off-road was improved.

Index of steering stability in dry condition is the evaluation of steering stability on dry surface road, and the evaluation was made by test drivers through feeling when driving a circuit course of dry condition in various sport modes. As a result, the implemented article index was raised to 105 compared with the comparison article index of 100, which shows the steering stability on dry surface road was improved.

Index of steering stability in wet condition is the evaluation of steering stability on wet surface road, and the evaluation was made by test drivers through feeling when driving a circuit course of wet condition in various sport modes. As a result, the implemented article index was raised to 105 compared with the comparison article index of 100, which shows the steering stability on wet surface road was improved.

From the above mentioned results, it was proved that the present invention can enhance cornering performance on each road surface while ensuring traction performance and braking performance of a pneumatic tire 1 on a snow road or off-road and improve steering stability through improvement of off-road performance and snow road performance.

The invention claimed is:

1. A pneumatic tire comprising:
a plurality of land rows formed with a plurality of main grooves extending in a tire peripheral direction, in a tread unit thereof, the land rows being partitioned into a plurality of blocks by a plurality of lug grooves intersecting the main grooves, wherein
a block of said plurality of blocks has a width at an edge portion of a main groove of the plurality of main grooves;
at least one of the land rows has a notch cut into each of the blocks from the edge portion, the notch having a plan view trapezoidal shape, a width of the notch is gradually reduced toward the tread end side, such that the width of the notch at the edge portion of the main groove is smaller than the width of the block at the edge portion of the main groove, and
the notch has an inclined surface therein in a stairstep shape, the inclined surface extending in a groove bottom direction substantially from the edge portion of the main groove to a ground contact surface of block, wherein stairsteps of the stairstep shape extend substantially parallel to the edge portion of the main groove.

2. The pneumatic tire according to claim 1, wherein the stairsteps comprise a plurality of recessed curved surfaces and protruding ridges provided between the recessed curved surfaces.

3. The pneumatic tire according to claim 2, wherein the protruding ridge is constituted by an upper surface which is parallel in tire width direction and a side surface which is parallel in tire radial direction, and an angle of top end side of the protruding ridge is formed to be 80 degrees to 120 degrees.

4. The pneumatic tire according to claim 3, wherein the inclined surface includes at least two protruding ridges.

5. The pneumatic tire according to claim 3, wherein,
a shoulder land row disposed between a tread end of the tread unit and the outside-most main groove in the tire width direction has the block having a plan-view trapezoidal shape, width of which is gradually reduced from the main groove side toward the tread end side; and
a main groove side edge portion of the trapezoidal shape block has the notch.

6. The pneumatic tire according to claim 2, wherein the inclined surface includes at least two protruding ridges.

7. The pneumatic tire according to claim 6, wherein,
a shoulder land row disposed between a tread end of the tread unit and the outside-most main groove in the tire width direction has the block having a plan-view trapezoidal shape, width of which is gradually reduced from the main groove side toward the tread end side; and
a main groove side edge portion of the trapezoidal shape block has the notch.

8. The pneumatic tire according to claim 6, wherein, the recessed curved surface is formed between the protruding ridges.

9. The pneumatic tire according to claim 2, wherein,
a shoulder land row disposed between a tread end of the tread unit and the outside-most main groove in the tire width direction has the block having a plan-view trapezoidal shape, width of which is gradually reduced from the main groove side toward the tread end side; and
a main groove side edge portion of the trapezoidal shape block has the notch.

10. The pneumatic tire according to claim 1, wherein,
the block having a plan view trapezoidal shape is disposed between a tread end of the tread unit and the outside-most main groove in the tire width direction has the block having a plan-view trapezoidal shape, width of which is gradually reduced from the main groove side toward the tread end side; and
a main groove side edge portion of the trapezoidal shape block has the notch.

* * * * *